(12) United States Patent
Lendner et al.

(10) Patent No.: US 12,254,485 B2
(45) Date of Patent: *Mar. 18, 2025

(54) SYSTEMS AND METHODS FOR DISTRIBUTING CUSTOMIZABLE AND SHAREABLE TIERED OFFERS

(71) Applicant: TRANSFORM SR BRANDS LLC, Hoffman Estates, IL (US)

(72) Inventors: Eran Avigdor Lendner, Chicago, IL (US); Prashant Kumar, Palatine, IL (US); Mark Seth Bonchek, Weston, MA (US); Vanina Delobelle Chateau-Artaud, St. Charles, IL (US); Justin Marcus Cassey, Barrington, IL (US); Ilona Piwko, Des Plaines, IL (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/495,520

(22) Filed: Oct. 26, 2023

(65) Prior Publication Data

US 2024/0054517 A1 Feb. 15, 2024

Related U.S. Application Data

(63) Continuation of application No. 16/933,293, filed on Jul. 20, 2020, now Pat. No. 11,810,141, which is a
(Continued)

(51) Int. Cl.
*G06Q 30/02* (2023.01)
*G06Q 30/0207* (2023.01)
(Continued)

(52) U.S. Cl.
CPC ..... *G06Q 30/0214* (2013.01); *G06Q 30/0224* (2013.01); *G06Q 30/0239* (2013.01);
(Continued)

(58) Field of Classification Search
CPC ........... G06Q 30/0251; G06Q 30/0255; G06Q 30/0267; G06Q 30/0269; G06Q 30/0276;
(Continued)

(56) References Cited

U.S. PATENT DOCUMENTS

| | | | |
|---|---|---|---|
| 7,613,628 | B2 | 11/2009 | Ariff |
| 7,818,212 | B1 | 10/2010 | Mesaros |

(Continued)

FOREIGN PATENT DOCUMENTS

| | | | | |
|---|---|---|---|---|
| TW | I528195 B | 4/2016 | | |
| WO | 2011/101532 A | 8/2011 | | |
| WO | WO 2011/139643 A1 * | 11/2011 | ............. | G06Q 99/00 |

OTHER PUBLICATIONS

Will, M.O.; Huynh, T.; Vogel, V.; Stub, M., Word of mouth mobile for real world recommendations (English), 2010 14th International Coference on Intelligence in Next generation Networks (2010, pp. 1-6), Oct. 1, 2010 (Year: 2010).*

(Continued)

*Primary Examiner* — Marilyn G Macasiano
(74) *Attorney, Agent, or Firm* — McAndrews, Held & Malloy, Ltd.

(57) ABSTRACT

Offers are distributed by providing a plurality of offers to a first user and directing the first user to distribute the offers to selected additional users. The plurality of offers may be customized by the system based on the first user's previous interactions with the system, and may be further customized by the first user before sending the offers to the selected additional users. The additional users may include any user including known and/or unknown users and/or contact in the (Continued)

first's user networks including business and/or social networks. The system may also track and store information relating to the distribution, access, and redemption of the offer by the first user and the selected additional users and provide additional incentives based upon the access and redemption, and based upon interactions between the first user and the selected additional users. The system may further allow a system to distribute restricted offers to selected users, and/or allow selected users to share restricted offers with additional selected users.

20 Claims, 8 Drawing Sheets

Related U.S. Application Data continuation of application No. 13/323,037, filed on Dec. 12, 2011, now Pat. No. 10,719,840, which is a continuation-in-part of application No. 13/279,729, filed on Oct. 24, 2011, now abandoned.

(51) Int. Cl.
  *G06Q 30/0214* (2023.01)
  *G06Q 30/0241* (2023.01)
  *G06Q 30/0251* (2023.01)

(52) U.S. Cl.
  CPC ..... *G06Q 30/0251* (2013.01); *G06Q 30/0255* (2013.01); *G06Q 30/0267* (2013.01); *G06Q 30/0269* (2013.01); *G06Q 30/0276* (2013.01)

(58) Field of Classification Search
  CPC .......... G06Q 30/0208; G06Q 30/0236; G06Q 30/0237; G06Q 50/01; G06Q 30/0214; G06Q 30/0224; G06Q 30/0239; G06Q 30/0254; G06Q 10/067; G06Q 30/0246; G06Q 30/02; G06Q 30/0207
  See application file for complete search history.

(56) References Cited

U.S. PATENT DOCUMENTS

| | | |
|---|---|---|
| 7,848,960 B2 | 12/2010 | Rampell |
| 8,103,519 B2 | 1/2012 | Kramer |
| 8,281,027 B2 | 10/2012 | Martinez |
| 8,285,840 B2 | 10/2012 | Dobroth |
| 8,510,658 B2 | 8/2013 | Priyadarshan |
| 8,533,604 B1 | 9/2013 | Parenti |
| 8,712,841 B1 | 4/2014 | Rajagopalan |
| 8,732,073 B2 | 5/2014 | Thomas |
| 9,159,066 B2 | 10/2015 | Roeding |
| 9,269,078 B2 | 2/2016 | Carney |
| 9,288,638 B2 | 3/2016 | Ankolekar |
| 2001/0014868 A1 | 8/2001 | Herz |
| 2004/0064566 A1 | 4/2004 | Striemer |
| 2006/0036496 A1 | 2/2006 | Cowell |
| 2006/0085419 A1 | 4/2006 | Rosen |
| 2006/0136545 A1 | 6/2006 | Reistad |
| 2006/0253340 A1 | 11/2006 | Levchin |
| 2007/0156446 A1 | 7/2007 | Jolly |
| 2007/0168462 A1 | 7/2007 | Grossberg |
| 2007/0288312 A1 | 12/2007 | Wang |
| 2008/0033776 A1 | 2/2008 | Marchese |
| 2008/0091517 A1 | 4/2008 | Koonce |
| 2008/0300982 A1 | 12/2008 | Larson |
| 2009/0018918 A1 | 1/2009 | Moneypenny |
| 2009/0063283 A1 | 3/2009 | Kusumoto |
| 2009/0076912 A1 | 3/2009 | Rajan |
| 2009/0138348 A1 | 5/2009 | Higgins |
| 2009/0144201 A1 | 6/2009 | Gierkink |
| 2009/0163183 A1 | 6/2009 | O'Donoghue |
| 2009/0182631 A1 | 7/2009 | Higgins |
| 2009/0183112 A1 | 7/2009 | Higgins |
| 2009/0222358 A1 | 9/2009 | Bednarek |
| 2009/0276305 A1 | 11/2009 | Clopp |
| 2009/0319359 A1 | 12/2009 | Soza |
| 2010/0125490 A1 | 5/2010 | Kiciman |
| 2010/0125525 A1 | 5/2010 | Inamdar |
| 2010/0145777 A1 | 6/2010 | Ghosh |
| 2010/0185504 A1 | 7/2010 | Rajan |
| 2010/0185520 A1 | 7/2010 | Gottfried |
| 2010/0191598 A1 | 7/2010 | Toennis |
| 2010/0223097 A1 | 9/2010 | Kramer |
| 2010/0228614 A1 | 9/2010 | Zhang |
| 2010/0274624 A1 | 10/2010 | Rochford |
| 2010/0306249 A1 | 12/2010 | Hill |
| 2011/0022448 A1 | 1/2011 | Strock |
| 2011/0087540 A1 | 4/2011 | Krishnan |
| 2011/0161165 A1 | 6/2011 | Gierkink |
| 2011/0264494 A1 | 10/2011 | Lechowicz |
| 2011/0276377 A1 | 11/2011 | Kim |
| 2011/0282722 A1 | 11/2011 | Chopra |
| 2011/0320250 A1 | 12/2011 | Gemmell |
| 2012/0029987 A1 | 2/2012 | Kusumoto |
| 2012/0036448 A1 | 2/2012 | John |
| 2012/0041817 A1 | 2/2012 | Priyadarshan |
| 2012/0041969 A1 | 2/2012 | Priyadarshan |
| 2012/0116897 A1 | 5/2012 | Klinger |
| 2012/0158477 A1 | 6/2012 | Tennenholtz |
| 2012/0166267 A1 | 6/2012 | Beatty |
| 2012/0185310 A1* | 7/2012 | Greenspun .......... G07F 17/3255 705/14.12 |
| 2012/0191777 A1 | 7/2012 | Iwasaki |
| 2012/0209674 A1 | 8/2012 | Neystadt |
| 2012/0215618 A1 | 8/2012 | Myman |
| 2013/0124281 A1* | 5/2013 | Evans ................ G06Q 30/0213 705/14.13 |
| 2013/0124283 A1 | 5/2013 | Kaulbach |
| 2013/0159089 A1 | 6/2013 | Gil |
| 2015/0119002 A1 | 4/2015 | Chen |

OTHER PUBLICATIONS

Will, M.O.; Huynh, T.; Vogel, V.; Stub, M., Word of mouth mobile marketing for real world recommendations (English), 2010 14th International Conference on Intelligence in Next Generation Networks, (2010, pp. 1-6), Oct. 1, 2010 (Year: 2010).*
Int'l Search Report and the Written Opinion Appln No. PCT/US2012/061024 dated Jan. 8, 2013.
Int'l Search Report and the Written Opinion Appln No. PCT/US2012/069064 dated Feb. 25, 2013.
Canadian Examiner Requisition Appln No. 2,853,459 dated Jun. 6, 2017.
Recommend-It.com, RecommenditCGI (1998), Internet Archive, printed Nov. 23, 2005.
Canadian Examiner Requisition Appln No. 2,853,459 dated Jun. 21, 2021.
Canadian Examiner's Requisition Appln No. 2,853,459 dated Oct. 17, 2022.
Towards a Platform for User-Generated Mobile Services, Tacken et al., 2010 IEEE 24th International Conference on Advanced U Information Networking and Applications Workshops.
Canadian Examiner's Requisition Appln No. 2,853,459 dated Oct. 6, 2023.

* cited by examiner

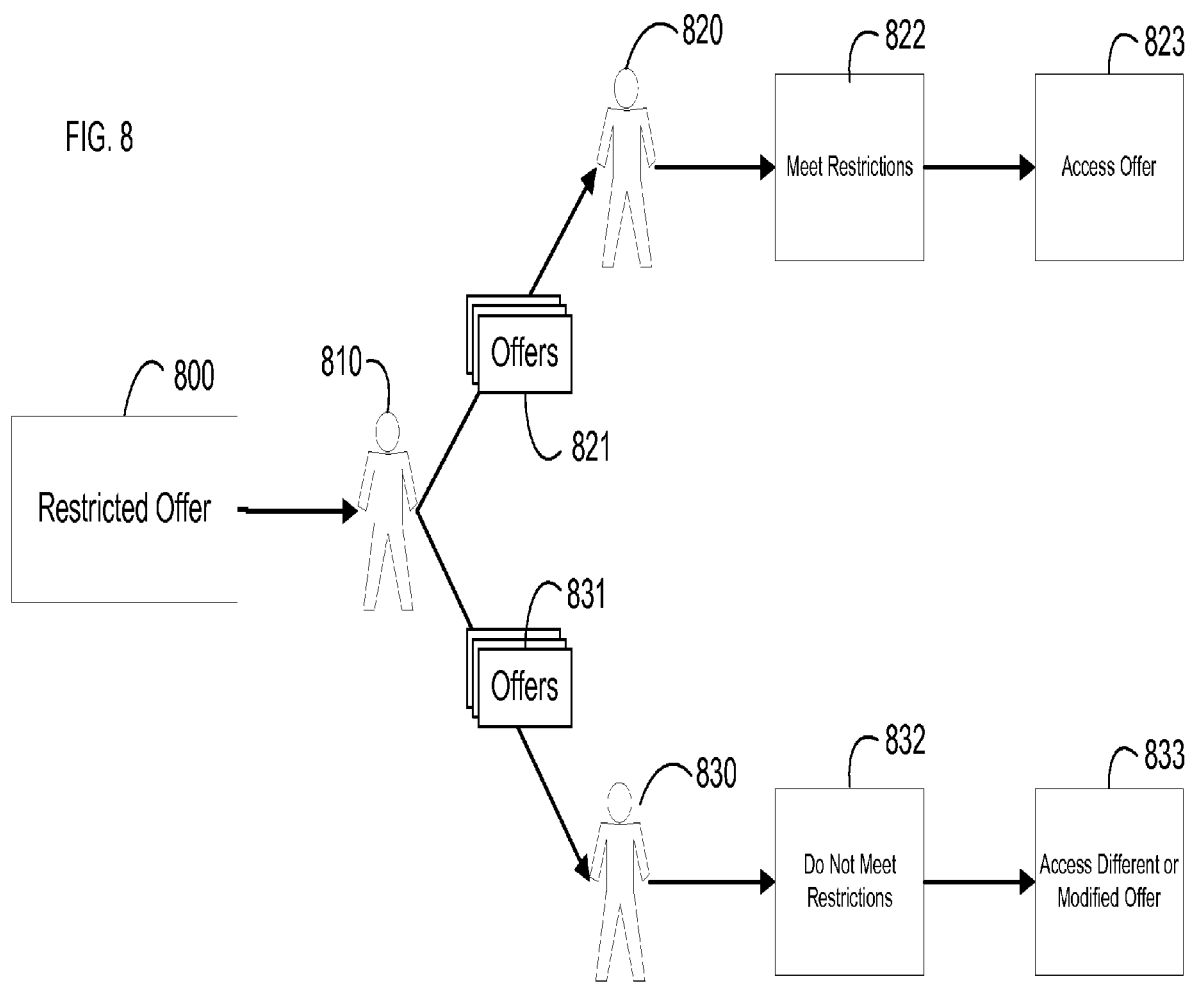

SYSTEMS AND METHODS FOR DISTRIBUTING CUSTOMIZABLE AND SHAREABLE TIERED OFFERS

RELATED APPLICATIONS/INCORPORATION BY REFERENCE

This application is a continuation of U.S. application Ser. No. 16/933,293, filed Jul. 20, 2020, which is a continuation of U.S. application Ser. No. 13/323,037, filed Dec. 12, 2011, which is a continuation-in-part of U.S. application Ser. No. 13/279,729, filed Oct. 24, 2011. The above-identified applications are hereby incorporated herein by reference in their entirety.

FIELD OF THE DISCLOSURE

The present disclosure generally relates to offer distribution, and more particularly to systems and methods for distributing customizable and shareable tiered offers via a computer network.

BACKGROUND

In the art, methods for distributing customized offers are generally known. For example, there exist in the art applications that allow the system to distribute offers to known customers, and customize the nature of the offer based on a customer's purchase history, or based on the number of offers distributed. Further, there exists in the art methods for distributing offers through a user's social network, such as, for example, by distributing offers to users, and allowing users to distribute those offers to other customers in their social network.

The system can track the information that is shared by it's customers to other members of the user's social network. For example, various organizations encourage the distribution of offers by providing incentives to users who distribute the offers to additional selected users.

While the background systems and methods identified herein, which are incorporated herein by reference in their entirety, generally work for their intended purpose, there is currently no known way for a system to create customizable tiered offers, to send the customized offers to selected users, to direct those users to distribute the customized offers to other users, and to track the use and/or distribution of the customized offers through a distribution such as through at least one social network.

SUMMARY

In accordance with this and other needs, the following generally discloses systems and methods for distributing customizable and shareable tiered offers via a computer network. Such a method allows a system to distribute customizable offers that, in some instances can be customized further by the user, and distributed to other members via any suitable means including via the user's social network. The systems and methods also track the distribution and/or use of those offers as they travel through the distribution network. These systems and methods further track the access and/or redemption of the offers and allows the system to reward users who distributed offers that were subsequently accessed and/or redeemed. The method further allows an system to distribute offers that are divided into a several tiers, such that, for example, the first group of users to receive the offer receive the lowest tiered offer, and after a certain number of offers have been distributed and/or accessed subsequent users receive the next tiered offer. The systems and methods may also track the interactions between users, and generate additional offers in response to interaction between users. The system and methods may further allow a system to distribute restricted offers to selected users, and/or allow selected users to share restricted offers with members of the selected user's social network.

A better appreciation of the objects, advantages, features, and properties of the disclosed method will be obtained from the following detailed description and accompanying drawings, which set forth illustrative embodiments that are indicative of the various ways in which the principles described hereinafter may be employed.

BRIEF DESCRIPTION OF THE DRAWINGS

For a better understanding of the present disclosure, reference may be had to various examples shown in the attached drawings.

FIG. 8 illustrates in block diagram form one example of the offer distribution method in accordance with the present disclosure.

DETAILED DESCRIPTION

Figure 1:
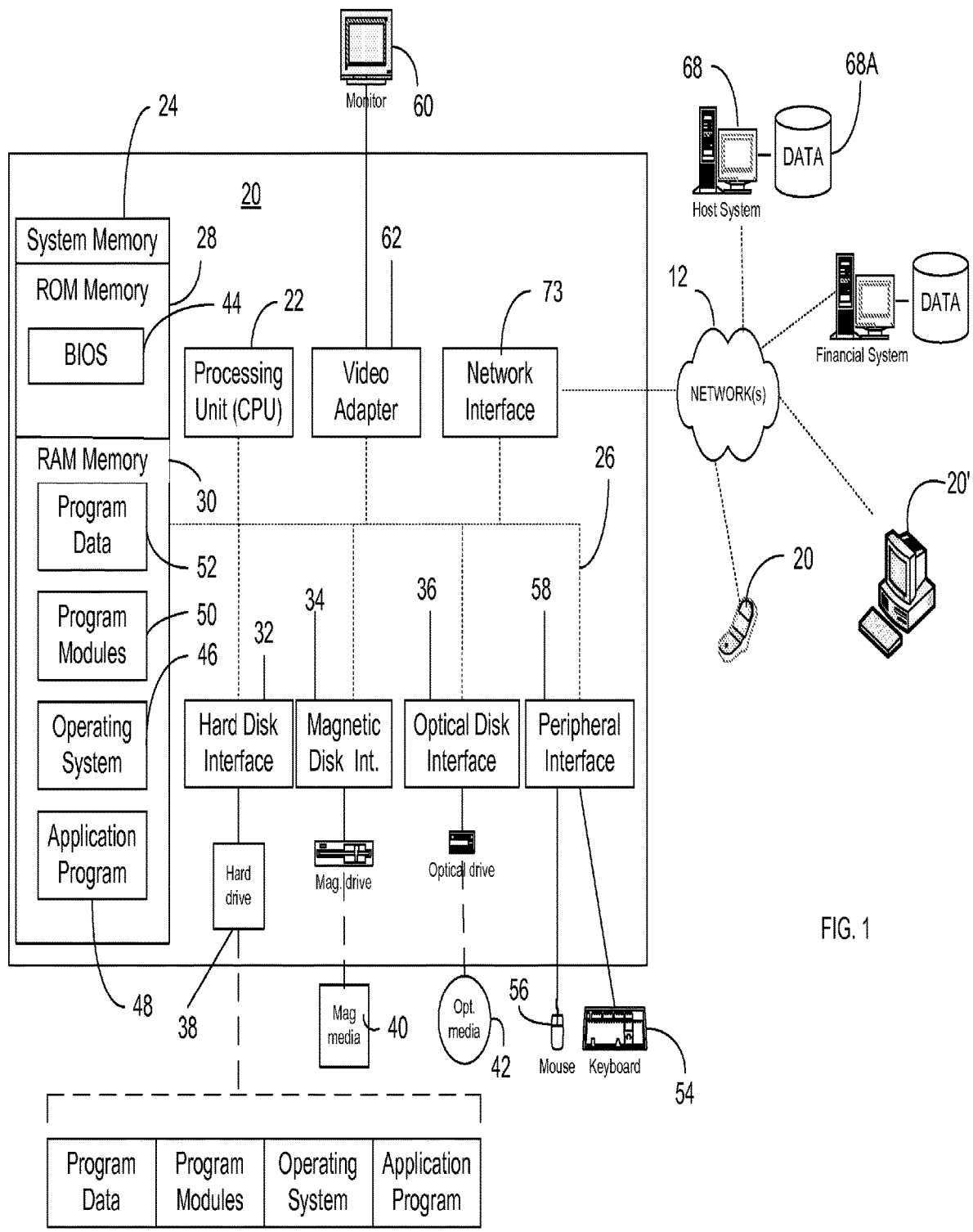
FIG. 1 illustrates in block diagram form components of an example, online, retail, computer network environment.

With reference to the figures, the following describes various example systems and methods for distributing offers to users via a computer network. To this end, a processing device 20, illustrated in the exemplary form of a computer system, is provided with executable instructions to, for example, provide a means for a user, e.g., a consumer, customer, etc., to access an organization system server 68 and, among other things, receive, distribute and/or customize selected offers from the system. Generally, the computer executable instructions reside in program modules which may include routines, programs, objects, components, data structures, etc. that perform particular tasks or implement particular abstract data types. Accordingly, those of ordinary skill in the art will appreciate that the processing device 20 illustrated in FIG. 1 may be embodied in any device having the ability to execute instructions such as, by way of example, a personal computer, mainframe computer, personal-digital assistant ("PDA"), cellular telephone, or the like. Furthermore, while described and illustrated in the context of a single processing device 20, those of ordinary skill in the art will also appreciate that the various tasks described hereinafter may be practiced in a distributed environment having multiple processing devices linked via a local or wide-area network whereby the executable instructions may be associated with and/or executed by one or more of multiple processing devices.

For performing the various tasks in accordance with the executable instructions, the processing device 20 preferably includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer readable instructions, data structures, program modules and other data for the processing device 20. Those of ordinary skill in the art will further appreciate that other types of non-transitory computer readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example via a network connection.

To allow a user to enter commands and information into the processing device 20, input devices such as a keyboard 54 and/or a pointing device 56 are provided. While not illustrated, other input devices may include a microphone, a joystick, a game pad, a scanner, a camera, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as speakers and printers.

As noted, the processing device 20 may also utilize logical connections to one or more remote processing devices, such as the organization system server 68 having associated data repository 68A. In this regard, while the organization system server 68 has been illustrated in the exemplary form of a computer, it will be appreciated that the organization system server 68 may, like processing device 20, be any type of device having processing capabilities. Again, it will be appreciated that the organization system server 68 need not be implemented as a single device but may be implemented in a manner such that the tasks performed by the organization system server 68 are distributed amongst a plurality of processing devices/databases located at different geographical locations and linked through a communication network. Additionally, the organization system server 68 may have logical connections to other third party systems via the network 12 and, via such connections, will be associated with data repositories that are associated with such other third party systems. Such third party systems may include, without limitation, systems of banking, credit, or other financial institutions, systems of third party providers of goods and/or services, systems of shipping/delivery companies, etc.

For performing tasks as needed, the organization system server 68 may include many or all of the elements described above relative to the processing device 20. In addition, the organization system server 68 may generally include executable instructions for, among other things, selecting a user, customizing offers tailored to the selected user, distributing offers to the selected user, and tracking the selected user's further customization of the distributed offers, tracking the selected user's distribution of the customized offer to additional selected users, tracking the access, and/or use of the customized offer by the additional selected users, mapping and storing the relationships between the selected user and the additional selected users, and sending rewards to the selected user after the offer is accessed and/or used by on of the additional selected users.

Communications between the processing device 20 and the organization system server 68 may be exchanged via a further processing device, such as a network router 72, that is responsible for network routing. Communications with the network router 72 may be performed via a network interface component 73. Thus, within such a networked environment, e.g., the Internet, World Wide Web, LAN, or other like type of wired or wireless network, it will be appreciated that program modules depicted relative to the processing device 20, or portions thereof, may be stored in the non-transitory memory storage device(s) of the vendor system server 68.

Figure 2:
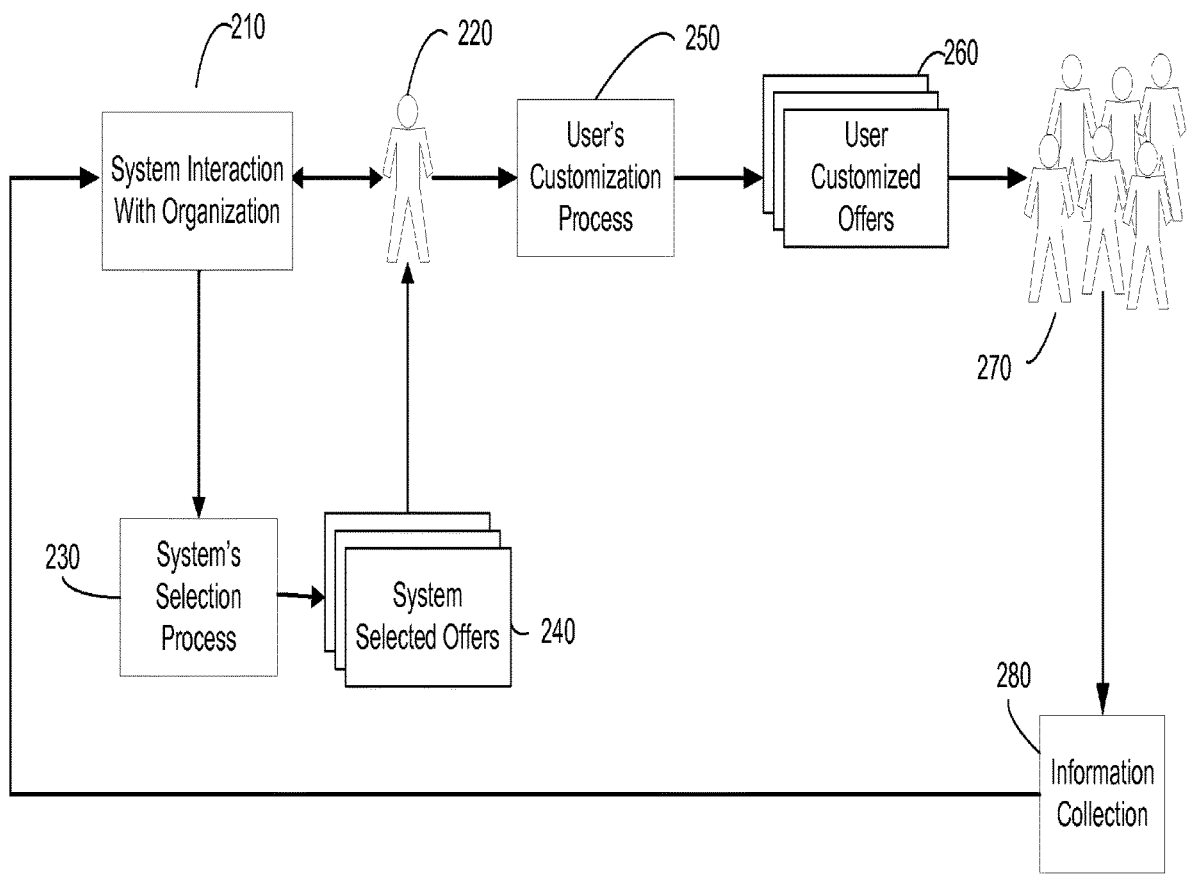
FIG. 2 illustrates in block diagram form one example of the offer distribution method in accordance with the present disclosure.

Referring to FIG. 2, there is illustrated a general schematic of an offer distribution system and method in accordance with one example of the present disclosure. In the illustrated example, a system first selects an initial user 220 to receive an offer in accordance with the offer distribution enclosed herein. Without limitation, one of ordinary skill in the art will recognize that the initial user may be selected, for example, at random, based on the initial user's purchasing history, based on the initial user's purchasing patterns, based on the initial user's geographic location, based on the geographic location of the user's social network connections, based on the initial user's social network connections, based on the user's social networking popularity, or any other suitable selection criterion. At block 210 the selected initial user 220 interacts with a system, which may include the user's 220 interaction with an organization, association, corporation, business, system, entity, and/or any other suitable establishment. The interaction at block 210 may include, for example, interaction through the Internet, physical locations, telephonic communications, cellular communications, social media, wireless communications, printed communications, etc. Next in block 230 the system selects certain offers 240 for the initial user 220. The system may select offers based on, for example, the initial user's interaction with the system, 210, the initial user's purchase history, the initial user's visit history, the frequency of the initial user's interactions with the system, the frequency of the initial user's interactions with an organization, the initial user's member profile, the initial user's preferences, the initial user's biographical information, the initial user's geographic information, the number of social media contacts the initial user has, the initial user's social connections, public information available about the initial user, an organization's internal marketing strategy, and/or any other selection criterion.

After the initial user 220 receives the offers selected by the system 240, the initial user 220 may, in this example, customize the offers further in block 250. In this disclosure, an offer may be, for example, a discount on an organization's goods and/or services, complimentary goods and/or services, membership benefits, financial compensation, financial services, etc. The initial user's customization process 250 may include, for example, customization in the form of a personalized text message, a personalized audio message, a personalized video message, a social media message, an additional webpage link, a physical enclosure, and/or other customization. The customization process 250 may also include, for example, selecting a subset of offers amongst the offers 250 received from the system.

The initial user 220 customized offers 260 are then distributed to additional users 270 that are selected by the initial user 220, and/or are selected for the user based upon the identifiable user connections. The additional selected users 270 may be selected from, for example, the initial user's 220 social network, and/or multiple social networks, address book, email contacts, phone contacts, or may be based on the initial user's IP address, wireless network, geographic location, and/or any other suitable selection process. The additional selected users 270 may be selected, for example, automatically based on available contacts, semi-automatically based on the initial user's 220 pre-set preferences, semi-automatically based on the system's pre-set preferences, and/or manually by the initial user 220. The initial user 220 customized offers 260 may be distributed via a computer network, or may be distributed physically.

After the additional selected users 270 receive the user customized offers 260, the system may maintain and/or otherwise collect information at block 280. During information collection 280 the system may collect information, such as for example, on which user customized offers 260 were sent to the additional selected users 270, what types of customizations were made by the initial user 220, whether the additional selected users 270 accessed, printed or redeemed the customized offers 260, what types of interactions the additional selected users 270 had with the system following the receipt of the user customized offers 260, the purchase history of the selected additional users, and/or other suitable information. The information collected in block 280 is then stored by the system as part of the initial user's 220 interaction with the system 210.

Figure 3:
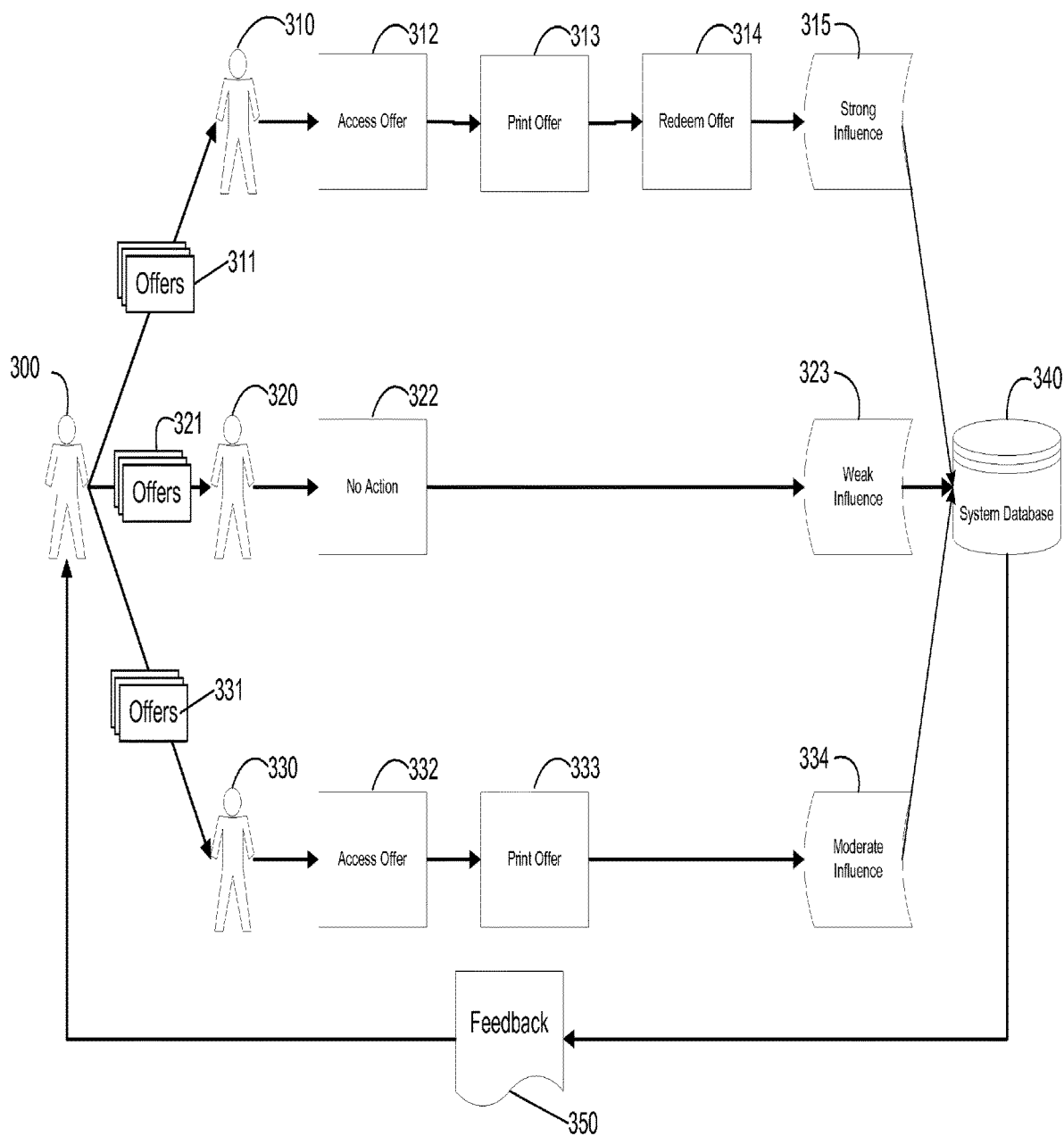
FIG. 3 illustrates in block diagram form one example of the offer distribution method in accordance with the present disclosure.

FIG. 3 illustrates one example of how a system may track and store information collected regarding a user's distribution of offers to selected additional users. In the illustrated example, an initial user 300 distributes offers 311, 321, and 331 to additional selected users 310, 320, and 330, respectively. The distributed offers 311, 321, and 331 may be, for example, a single offer, and/or several offers. The offers 311, 321, and 331, also may be, for example, customized by the system based on the initial user's 300 previous interaction with the system, and/or may be customized by initial user 300 using, for example, personalized text message, a personalized audio message, a personalized video message, a social media message, an additional webpage link, or a physical enclosure. The offers 311, 321, and 331 may be identical from one another or different from one another.

In the illustrated example, at least one additional selected user 310 accesses the offer 312. The additional selected user 310 may access the offer 312, for example, on a personal computer, a mobile device, a cellular phone, a personal digital assistant (PDA), a retail kiosk, and/or a physical medium using, such as, for example, the Internet, an internal network, or a social network. The additional selected user 310 next prints the offer 313, for example, by printing a physical document, by downloading information to a saved location, by manually copying an offer code and/or by adding the user's 310 name to a list maintained by the system. After the additional selected user 310 accesses the offer, the additional selected user 310 may redeem the offer 314 as desired. The user 310 may redeem the offer 314 in a variety of ways, for example, by bringing a physical copy of the offer to a retail location, purchasing an item at a physical retail location, purchasing an item through an online retail site, signing up for an organization's newsletter, creating a profile in an system's database, signing up for a financial service, making a post on a social networking site, publishing a review of certain goods and/or services, distributing the offer to other additional selected users, and/or performing any other appropriate redemption act.

In the illustrated example, because the additional selected user 310 redeemed the offer 311 distributed by the initial user 300, the system may deem that the initial user 300 has strong influence 315 over the additional selected user 310. The strong influence data 315 may additionally include information such as, for example, which offers 311 were sent to the additional selected user 310, when the offers 311 were sent to the additional selected user 310, the frequency of the additional selected user's 310 visits to the system, the additional selected user's 310 interactions with the system, and the additional selected user's 310 purchase history. This strong influence data 315 is stored in the system's database 340.

In the illustrated example, at least one additional selected user 320 receives the offers 321 from initial user 300 and takes no action at block 322, for example, by not accessing the offer, by deleting the communication from user initial 300, and/or by not taking any steps to interact with the system. In this example, since the additional selected user 320 took no action after receiving the offer 321, the system may deem that the initial user 300 has weak influence 323 over the additional selected user 320. The weak influence data 323 may additionally include information such as, for example, which offers 321 were sent to the additional selected user 320, when the offers 321 were sent to the additional selected user 320, the additional selected user's 320 history of interactions with the system, and the additional selected user's 320 purchase history, and/or other relevant data. This weak influence data 323 may be stored in the system's database 340.

In the illustrated example, at least one additional selected user 330 accesses the offer 331 but fails to redeem the offer 331. The additional selected user 330 may access the offer 331 at block 332, for example, on a personal computer, a mobile device, a cellular phone, a personal digital assistant (PDA) a retail kiosk or a physical medium, using, for example, the internet, an internal network, a social network, or a physical network. The additional selected user 330 next prints the offer 331 at block 333, for example, by printing a physical document, by downloading information to a saved location, by manually copying an offer code or by adding the user's 330 name to a list maintained by the system. In this example, the additional selected user 330, however does not redeem the offer 331.

In the illustrated example, because the additional selected user 330 accessed and printed the offer 331 distributed by the initial user 300, the system may deem that the initial user 300 has moderate influence 334 over additional selected user 330. The moderate influence data 334 may additionally include information such as, for example, which offers 331 were sent to the additional selected user 330, when the offers 331 were sent to the additional selected user 330, the additional selected user's 330 history of interactions with the system, and the additional selected user's 330 purchase history. This moderate influence data 334 may be stored in the system's database 340.

In the illustrated example, the information stored in the system database 340 may, for example, be used by the system to map connections between initial users and selected additional users, to store the history of offer distribution, to track influence of initial users, and/or to track interactions that selected additional users have with a system.

In another aspect of the present disclosure, the system database 340 provides feedback 350 to the initial user 300 regarding the actions of the selected additional user. The feedback 350, for example, may be in the form of monetary rewards, reward offers, reward points, increased status within the system, membership rewards, and other types of encouragement and/or recognition when, for example, selected additional users access, print or redeem the offer. In another example, feedback 350 may be in the form of monetary deductions, deducted reward points, decreased status within a system, decreased membership status and/or other types of penalties when, for example, selected additional users take no action on the offer.

Figure 4:
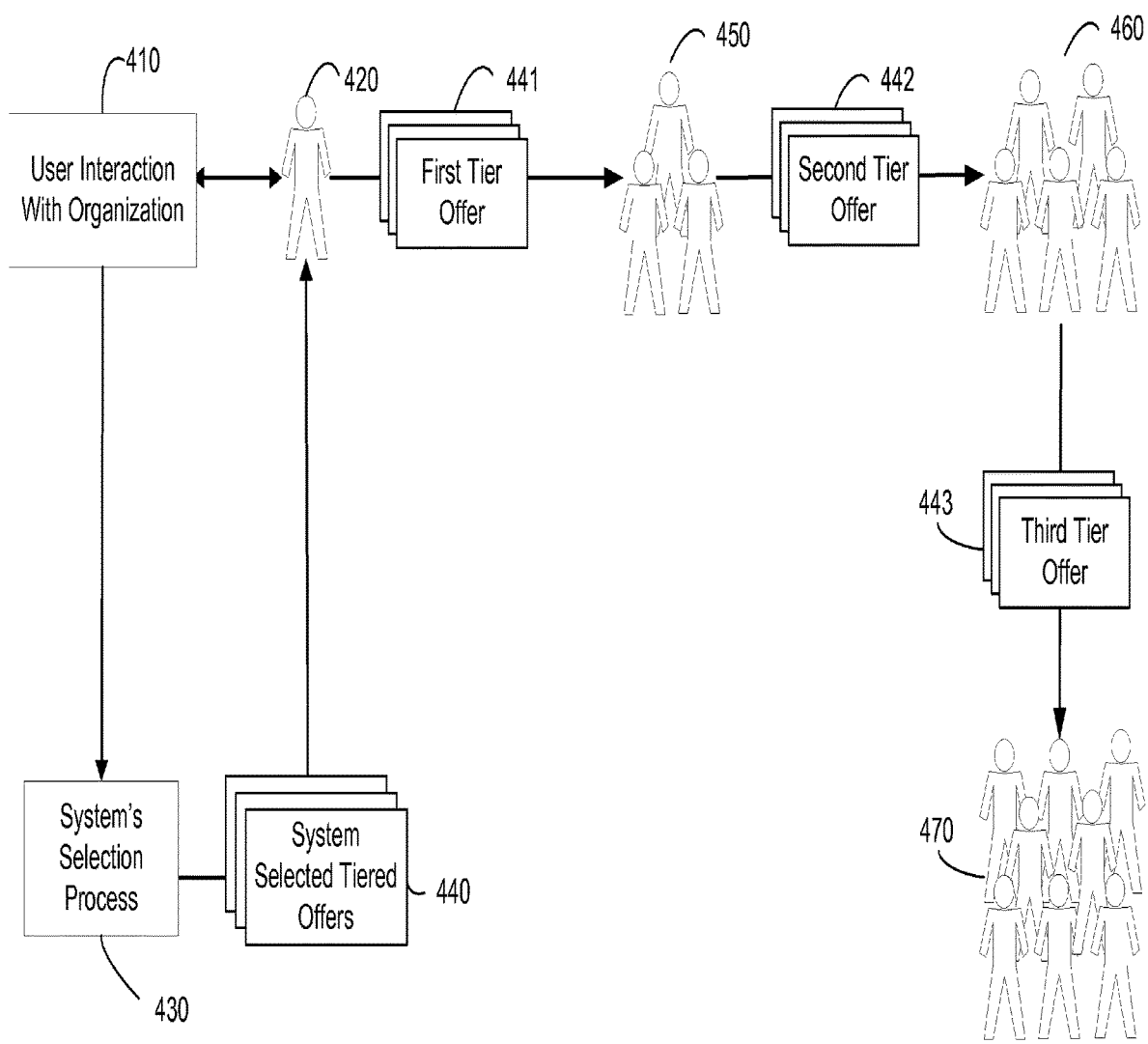
FIG. 4 illustrates in block diagram form one example of the offer distribution method in accordance with the present disclosure.

FIG. 4 illustrates an example of how customized offers, and in particular tiered offers, may be distributed by a user to selected additional users. The interaction between an initial user 420 at block 410 may include, for example, interaction through the Internet, physical locations, telephonic communications, cellular communications, social media, wireless communications, and/or printed communications. Next in block 430 the system selects certain offers 440 for the initial user 420. The system may select offers based on, for example, the initial user's interaction with the system, 410, the initial user's purchase history, the initial user's visit history, the frequency of the initial user's interactions, the initial user's member profile, the initial user's preferences, the initial user's biographical information, the initial user's geographic information, the number of contacts the initial user has, the initial user's social connections, public information available about the initial user, etc.

In the present example, the offers selected by the system are tiered offers 440. In one example of the present disclosure, tiered offers operate so that the first group of users 450 to receive the offer receive a first tiered offer 441. After a requisite number of first tiered offers 441 are distributed, the next group of users 460 to receive the offer receive the second tier offer 442. After a requisite number of second tier offers are distributed, the next group of users 470 to receive the offer receive a third tier offer 443 and so on. A person of ordinary skill in the art will recognize, however, that the disclosed method for distributing tiered offers can encompass any offers that are divided into any number of tiers that a system may desire.

One of ordinary skill the in the art will recognize that the example tiers may be unlocked in different ways, for example, a tier may be unlocked after a certain number of offers are distributed, after a certain number of users access the offer, after a certain number of users print the offer, after a certain number of users redeem the offer, etc.

One of ordinary skill in the art will also recognize that users may receive offers for example, from a system, from an organization, from an initial user 420 selected by an system, from other users who have received offers from users who have been selected by an system, and/or from any other source.

The example tiered offers 440, may comprise high-to-low discounts, for example, the first 100 users to access the offer receive a 50% discount, the next 100 users to access the offer receive a 25% discount, and the next 100 users to access the offer receive a 10% discount. In another example, the tiered offers 440 may comprise low-to-high discounts, for example, the first 100 users to access the offer receive a 10% discount, the next 100 users to access the offer receive a 25% discount, and the next 100 users to access the offer receive a 50% discount. The tiered offers for example, may contain a limited number of total offers, may be unlimited, may be limited by use restrictions, or date restrictions.

Figure 5:
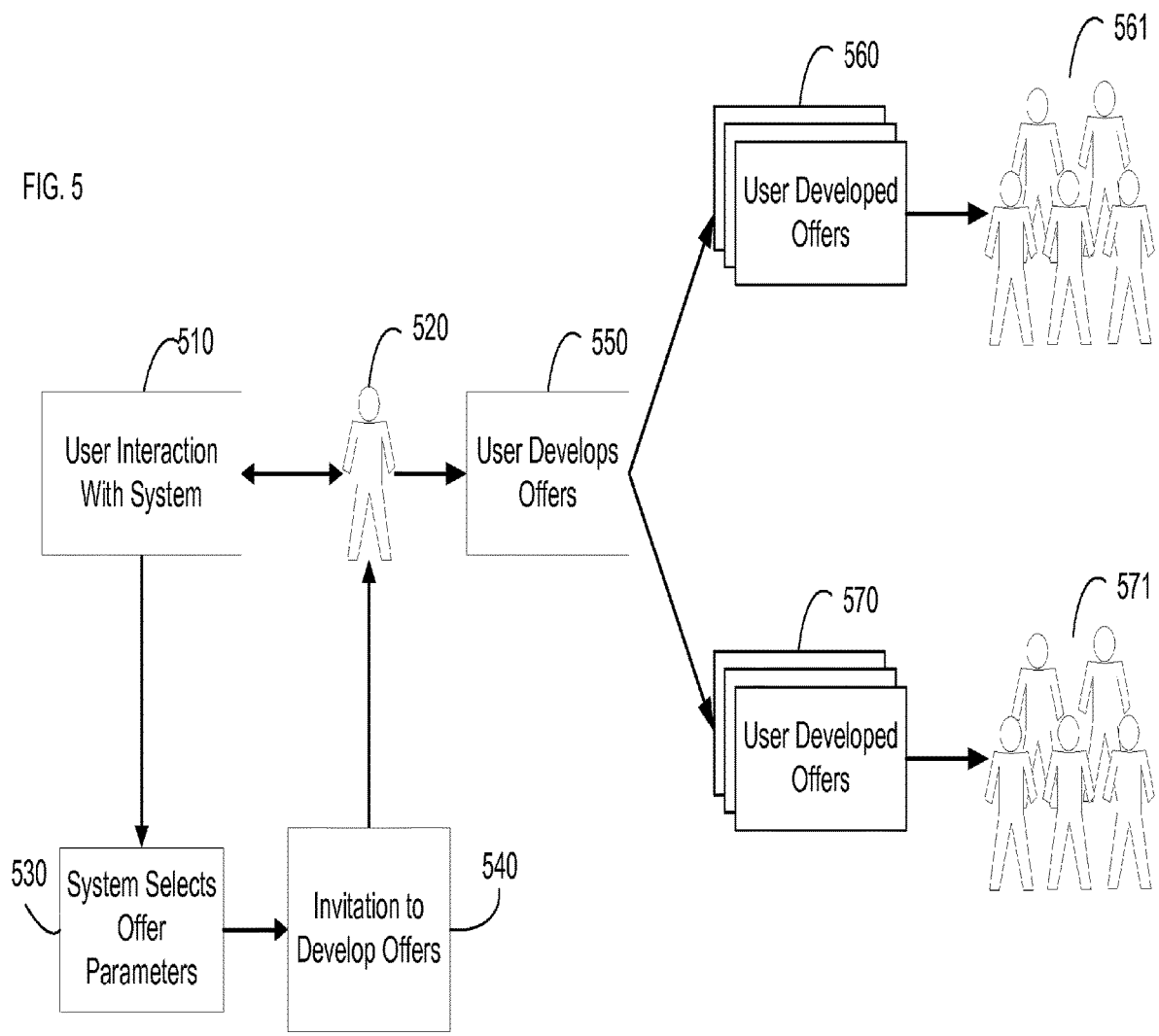
FIG. 5 illustrates in block diagram form one example of the offer distribution method in accordance with the present disclosure.

FIG. 5 illustrates another example of how offers may be customized by a system and a user before the offers are distributed to additional selected users. In this example, an initial user 520 interacts with a system in block 510. One of ordinary skill in the art will recognize that the initial user may be selected, for example, at random, based on the initial user's purchasing history, based on the initial user's purchasing patterns, based on the initial user's geographic location, based on the initial user's social network connections, or based on the user's social networking popularity.

The interaction at block 510 may include, for example, interaction through the Internet, physical locations, telephonic communications, cellular communications, social media, wireless communications, printed communications, etc. Next in block 530 the system selects certain offer parameters for the initial user 520. The system may select offer parameters based on, for example, the initial user's interaction with the system, 510, the initial user's purchase history, the initial user's visit history, the frequency of the initial user's interactions with the system, the initial user's member profile, the initial user's preferences, the initial user's biographical information, the initial user's geographic information, the number of social media contacts the initial user has, the initial user's social connections, public information available about the initial user, profiles of the initial user's contacts and social connections, and/or an organization's internal marketing strategy.

In this example, the initial user 520 is then invited to develop customized offers 540. For example, the invitation to develop offers 540 may be an email invitation, a text message invitation, an invitation on a social networking site, an invitation on a user's account maintenance page, a telephonic invitation, an in-person invitation, and/or other invitation. In the present example, the initial user 520 is able to develop offers 550 based on the initial user's custom inputs and the system's selected offer parameters 230. For example, the initial user may input the number of offers to be created, the identity of the additional selected users that the offers will be distributed to, the product category that the offers will apply to, the discount amount for the offers, and/or the expiration date for the offers. In this example the initial user 510 selects a number of customized offers 560 to distribute to a certain group of selected additional users 561. The initial user 520 selects another group of offers 570 to distribute to another group of selected users. For example, the selected offers 560, 561 and the selected offers 570, 571, respectively may be entirely the same, may be entirely different, or may be different but both may contain some of the same offers.

Figure 6:
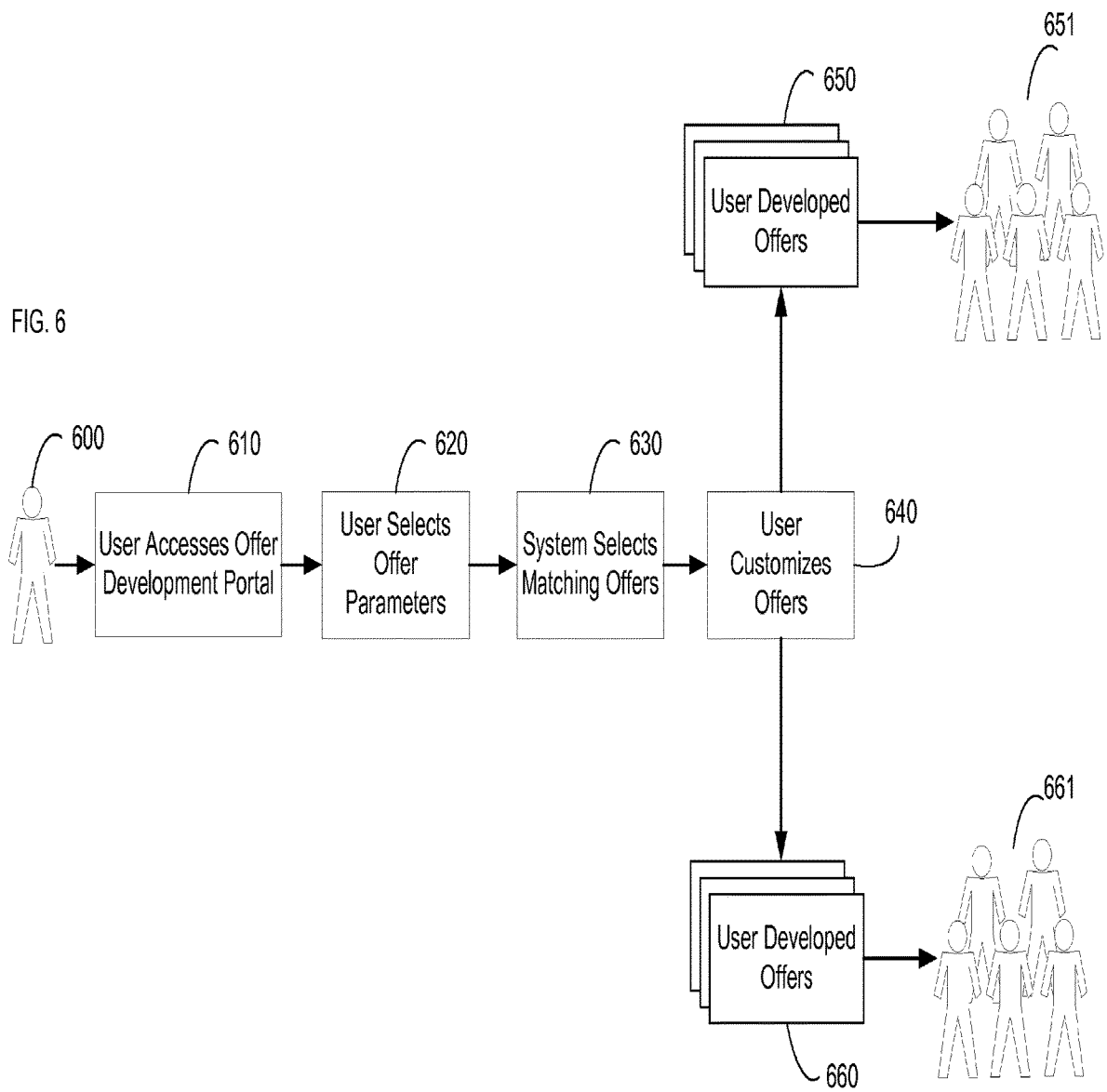
FIG. 6 illustrates in block diagram form one example of the offer distribution method in accordance with the present disclosure.

FIG. 6 illustrates another example of how offers may be customized before the offers are distributed to additional selected users. In this example, an initial user 600 accesses an offer development portal 610 (e.g. a user interface). The access development portal 610 may be maintained by the system, and may be, for example, hosted online, hosted on a retail kiosk, based in a telephonic network, based at a physical location, and/or any other suitable location. In this example, using the offer development portal the initial user 600 selects offer parameters 620. The user selected the offer parameters 620 may include, for example, the number of offers to be created, the identity of the additional selected users that the offers will be distributed to, the product category that the offers will apply to, the discount amount for the offers, and the expiration date for the offers. Next, using the user selected offer parameters 620, the system selects matching offers 630. The system may select matching offers based on any desirable selection criteria, including for example, the initial user's interaction with the system, the initial user's purchase history, the initial user's visit history, the frequency of the initial user's interactions with the system, the initial user's member profile, the initial user's preferences, the initial user's biographical information, the initial user's geographic information, the number of social media contacts the initial user has, the initial user's social connections, public information available about the initial user, profiles of the initial user's contacts and social connections, the selected additional users' purchase history, the selected additional users' visit history, the frequency of the selected additional users' interactions with the system, the selected additional users' member profile, the selected additional users' preferences, the selected additional users' biographical information, the selected additional users' geographic information, the number of social media contacts the selected additional users' has, the selected additional users' social connections, public information available about the selected additional users', and/or an organization's internal marketing strategies.

In this example, after the system selects matching offers 630, the initial user customizes the offers 640. The initial user's customization process 640 may include, for example, customization in the form of a personalized text message, a personalized audio message, a personalized video message, a social media message, an additional webpage link, or a physical enclosure. The customization process 640 may also include, for example, selecting a subset of offers amongst the matching offers received from the system. The customization process 640 may also include selecting a group of additional selected users 651 to receive a series of user developed offers 650. The customization process 640 may also include, selecting a second group of additional selected users 661 to receive a second series of user developed offers 660. By way of example, the user developed offers 650 and 660 may be entirely the same, may be entirely different, or may be different but both groups contain some of the same offers. For example, similarly, the selected additional users 651 and 661 may be entirely the same, may be entirely different, or may be different but both may contain some of the same users.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

Figure 7:
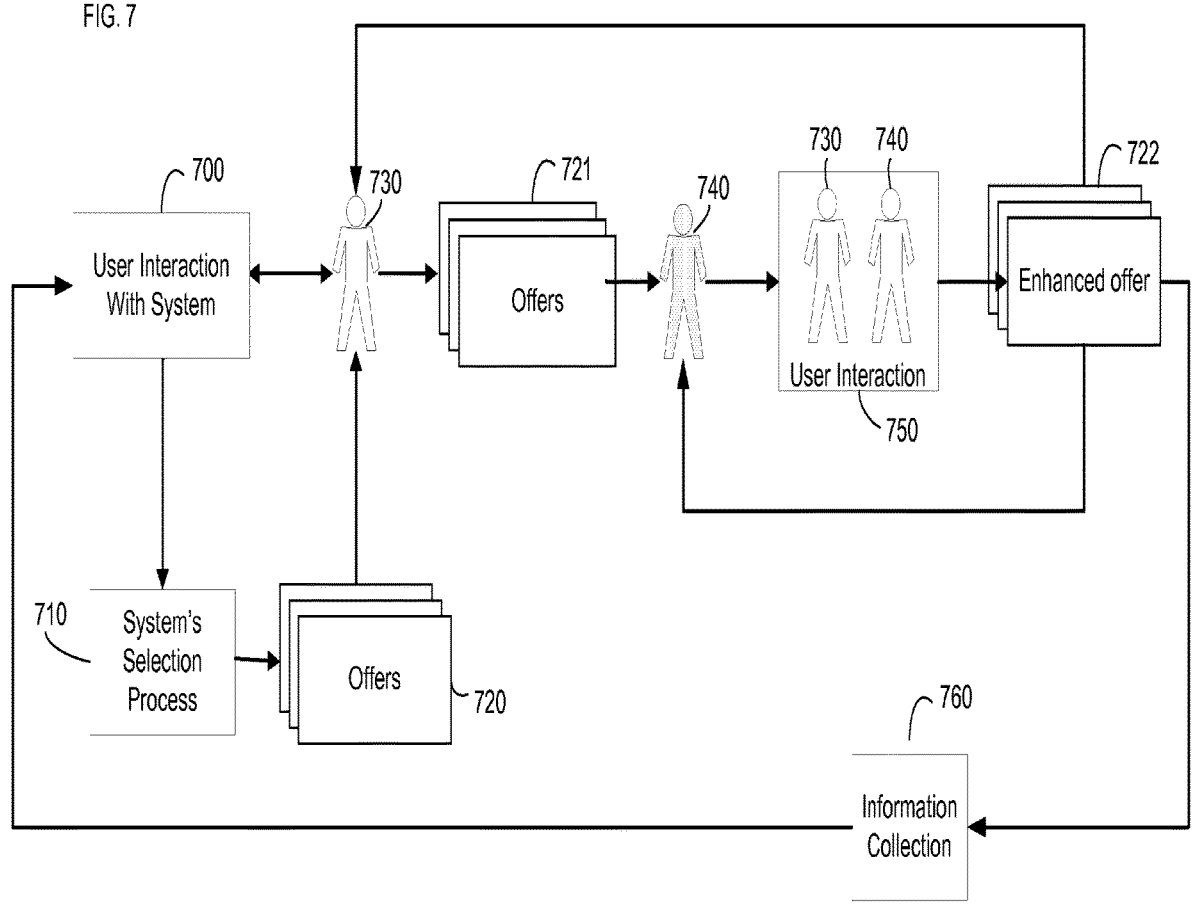
FIG. 7 illustrates in block diagram form one example of the offer distribution method in accordance with the present disclosure.

FIG. 7 illustrates an example of how the system may change and customize offers in response to interactions between users. In the illustrated example, an initial user 730 interacts with a system in block 700. One of ordinary skill in the art will recognize that the initial user may be selected, for example, at random, based on the initial user's purchasing history, based on the initial user's purchasing patterns, based on the initial user's geographic location, based on the initial user's social network connections, or based on the user's social networking popularity.

At block 700 the selected initial user 730 interacts with a system, which may include the initial user's 730 interaction with an organization, association, corporation, business, system, entity, and/or any other suitable establishment. The interaction at block 700 may include, for example, interaction through the Internet, physical locations, telephonic communications, cellular communications, social media, wireless communications, printed communications, etc. Next in block 710 the system selects certain offers 720 for the initial user 730. The system may select offers based on, for example, the initial user's interaction with the system, 700, the initial user's purchase history, the initial user's visit history, the frequency of the initial user's interactions with the system, the frequency of the initial user's interactions with an organization, the initial user's member profile, the initial user's preferences, the initial user's biographical information, the initial user's geographic information, the number of social media contacts the initial user has, the initial user's social connections, public information available about the initial user, an organization's internal marketing strategy, and/or any other selection criterion.

After the initial user 730 receives the offers selected by the system 720, the initial user 730 selects an additional selected user 740, and distributes the offers 721 to the additional selected user 740. One of ordinary skill in the art will recognize that the offers 721 may be customized by the initial user 730, for example, the offers 721 may include customization in the form of a personalized text message, a personalized audio message, a personalized video message, a social media message, an additional webpage link, a physical enclosure, and/or other customization. The initial user 730 may also customize the offers 721 by, for example, selecting a subset of offers amongst the offers 720 received from the system. One of ordinary skill in the art will also recognize that the initial user 730 may distribute the offers 721 via a computer network, a data network, an internet network, or a physical network.

The additional selected user 740 receives the offers 721 from the initial user 730. Next, at block 750, the initial user 730 and the additional selected user 740 interact. One of ordinary skill in the art will recognize that the interaction may take place over the internet, through cellular communications, through communications via smart phones, through e-mail correspondence, through blue tooth communications, through a Wi-Fi network, through social-media programs, through telephonic communications, in-person, at a retail location, through written correspondence and/or through some other means.

After the interaction at block 750 between the initial user 730 and the selected additional selected user 740, the system may generate enhanced offers 722. The enhanced offers 722 may, for example, offer increased discounts, apply to different product categories, apply to product categories selected by the initial user and/or the selected additional user, provide complimentary goods and/or services, membership benefits, financial compensation, financial services, etc. Once the enhanced offers 722 are generated, they are distributed to the initial user 730 and the selected additional user 740.

One of ordinary skill in the art will recognize that this cycle may repeat whereby the initial user 730 and the selected additional user 740 interact again at block 750, causing additional enhanced offers 722 to be generated, and whereby the additional enhanced offers 722 are distributed to the initial user 730 and the selected additional user 740. This cycle may also, for example, be limited by the system's pre-set settings, so that after a certain point, the system will not generate additional enhanced offers.

The system may maintain and/or otherwise collect information at block 760. During information collection 760 the system may collect information, such as for example, the nature of the user interaction at 750, the content of the enhanced offers 722, the nature of the offers 721 distributed by the initial user 730, what types of customizations were made by the initial user 730, whether the initial user 730 and/or the selected additional user 740 accessed, printed and/or redeemed the enhanced offers 722, what types of interactions the initial user 730 and/or the selected additional user 740 had with the system following the receipt of the enhanced offers 722, the purchase history of the initial user 730 and/or the selected additional user 740, and/or other suitable information. The information collected in block 760 is then stored by the system as part of the initial user's 730 interaction with the system 700.

FIG. 8 illustrates one example of how customized offers, and in particular time-sensitive offers, may be distributed by a user to selected additional users. In the present example, the system provides an initial user 810 with a restricted offer 800. One of ordinary skill in the art will recognize that the restricted offer may be restricted based on the time the offer may be accessed and/or redeemed, the types of goods the offer applies to, the discount level that the offer provides, the users who may access the offer, the number of offers that may be accessed, how the offer is accessed, the geographical scope of the offer, and/or any other appropriate restriction.

In this example, the initial user 810 may distribute a shared restricted offer(s) 821 and 831 to additional selected users 820 and 830, respectively. The shared restricted offer(s) 821 and 831 may be the same as the restricted offer 810, or the shared restricted offer(s) 821 and 831 may contain additional restrictions, and/or benefits. For example the shared restricted offer(s) 821 and 831 may contain additional restrictions on when the offer may be accessed and/or redeemed, the types of goods the offer applies to, the discount level that the offer provides, the users who may access the offer, the number of offers that may be accessed, how the offer is accessed, the geographical location that the offer applies to, and/or any combination of additional restrictions. On the other hand, the shared restricted offer(s) 821 and 831 may contain benefits such as extending the time restriction of the restricted offer 800, lifting the use restrictions of the restricted offer 800, increasing the discount level of the restricted offer 800, lifting the restrictions on who may access the restricted offer 800, lifting the restrictions on how the restricted offer 800 is accessed, lifting the geographical restrictions of the restricted offer 800, and/or any combination of benefits and additional restrictions.

In the present disclosure, the additional selected user 820 meets the restrictions of the shared restricted offer 821 at block 822, and as a result is able to access and/or redeem the offer at block 823. The user 820 may redeem the shared restricted offer 821 in a variety of ways, for example, by viewing the offer, purchasing an item at a physical retail location, purchasing an item through an online retail site, signing up for an organization's newsletter, creating a profile in an system's database, signing up for a financial service, making a post on a social networking site, publishing a review of certain goods and/or services, distributing the offer to other additional selected users, and/or performing any other appropriate redemption act.

While the previous example illustrates an instance where the user 820 meets the restrictions and accesses the offer, in another instance, at block 832, the additional selected user 830 does not meet the restrictions of the shared restricted offer 831 (e.g. by failing to meet the time limit, failing to apply the shared restricted offer to the types of goods specified, failing to meet the use restrictions, failing to access the shared restricted offer before the maximum number of offers have been accessed by other users, etc.) As a result the additional selected user 830 will not be given access to the shared restricted offer 831, but rather may be directed to a different offer, and/or modified offer, or may be provided with no offer at all.

What is claimed is:

1. A method comprising:
    generating, via a distributed network comprising a plurality of servers, a map comprising offer distribution histories and a plurality of users receiving one or more associated offers, wherein:
        the plurality of users are connected within the map according to a tracked social networking influence, and
        multiple servers of the distributed network are operable concurrently to execute instructions to generate the map;
    selecting, via the distributed network, a first user of the plurality of users according to the map;
    sending, via the distributed network, an invitation to the first user to develop a first offer for a second user;
    presenting a graphical user interface that is configured to enable the first user to develop the first offer according to:
        a selection by the second user,
        information about the second user,
        offer parameters according to information about the first user, and
        a message created by the first user and personalized to the second user;
    distributing the first offer to the second user;
    tracking, via the distributed network, a social networking influence of the first user according to an action of the second user with respect to the first offer; and
    distributing a second offer to the first user according to the action of the second user with respect to the first offer, wherein:
        the social networking influence is strong if the second user redeems the first offer,
        the social networking influence is moderate if the second user accesses the first offer, and
        the social networking influence is weak if the second user has no interaction with the first offer.

2. The method of claim 1, wherein the first user selects the second user according to social network connections of the first user.

3. The method of claim 1, wherein the first user selects the second user according to a member profile of the first user and public information about the first user.

4. The method of claim 1, wherein the graphical user interface is presented on a mobile device of the first user.

5. The method of claim 1, wherein the method comprises selecting the second user according to an IP address of the first user.

6. The method of claim 1, wherein the method comprises accessing the first offer at a retail kiosk by the second user.

7. The method of claim 1, wherein the method comprises accessing the first offer by the second user by creating a profile in a database.

8. The method of claim 1, wherein the method comprises accessing the first offer by the second user by making a post on a social networking site.

9. The method of claim 1, wherein the method comprises associating, with the first user, a number of times that the second user interacted.

10. The method of claim 1, wherein distributing the first offer comprises distributing from a mobile device of the first user.

11. The method of claim 1, wherein the first offer is based on the frequency of interaction of the first user and a number of social network contacts of the first user.

12. A non-transitory computer-readable medium having stored thereon instructions executable by a distributed network comprising a plurality of processing devices to cause the at least one processing device to perform a method for distributing customized offers to a plurality of user devices via a computer network, the method comprising:
   generating a map comprising offer distribution histories and a plurality of users receiving one or more associated offers, wherein:
      the plurality of users are connected within the map according to a tracked social networking influence, and
      multiple servers of the distributed network are operable concurrently to execute instructions to generate the map;
   selecting, via the distributed network, a first user of the plurality of users according to the map;
   sending, via the distributed network, an invitation to the first user to develop a first offer for a second user;
   presenting a graphical user interface that is configured to enable the first user to develop the first offer according to:
      a selection by the second user,
      information about the second user,
      offer parameters according to information about the first user, and
      a message created by the first user and personalized to the second user;
   distributing the first offer to the second user;
   tracking, via the distributed network, a social networking influence of the first user according to an action of the second user with respect to the first offer; and
   distributing a second offer to the first user according to the action of the second user with respect to the first offer, wherein:
      the social networking influence is strong if the second user redeems the first offer,
      the social networking influence is moderate if the second user accesses the first offer, and
      the social networking influence is weak if the second user has no interaction with the first offer.

13. The non-transitory computer-readable medium of claim 12, wherein the first user selects the second user according to one or more of a social network connection of the first user, a member profile of the first user, public information about the first user, and an IP address of the first user.

14. The non-transitory computer-readable medium of claim 12, wherein the graphical user interface is presented on a mobile device of the first user.

15. The non-transitory computer-readable medium of claim 12, wherein distributing the first offer comprises distributing from a mobile device of the first user.

16. The non-transitory computer-readable medium of claim 12, wherein the first offer is based on the frequency of interaction of the first user and a number of social network contacts of the first user.

17. The non-transitory computer-readable medium of claim 12, wherein the method comprises accessing the first offer at a retail kiosk by the second user.

18. The non-transitory computer-readable medium of claim 12, wherein the method comprises accessing the first offer by the second user by creating a profile in a database.

19. The non-transitory computer-readable medium of claim 12, wherein the method comprises accessing the first offer by the second user by making a post on a social networking site.

20. The non-transitory computer-readable medium of claim 12, wherein the method comprises associating, with the first user, a number of times that the second user interacted.

* * * * *